Figure 1:
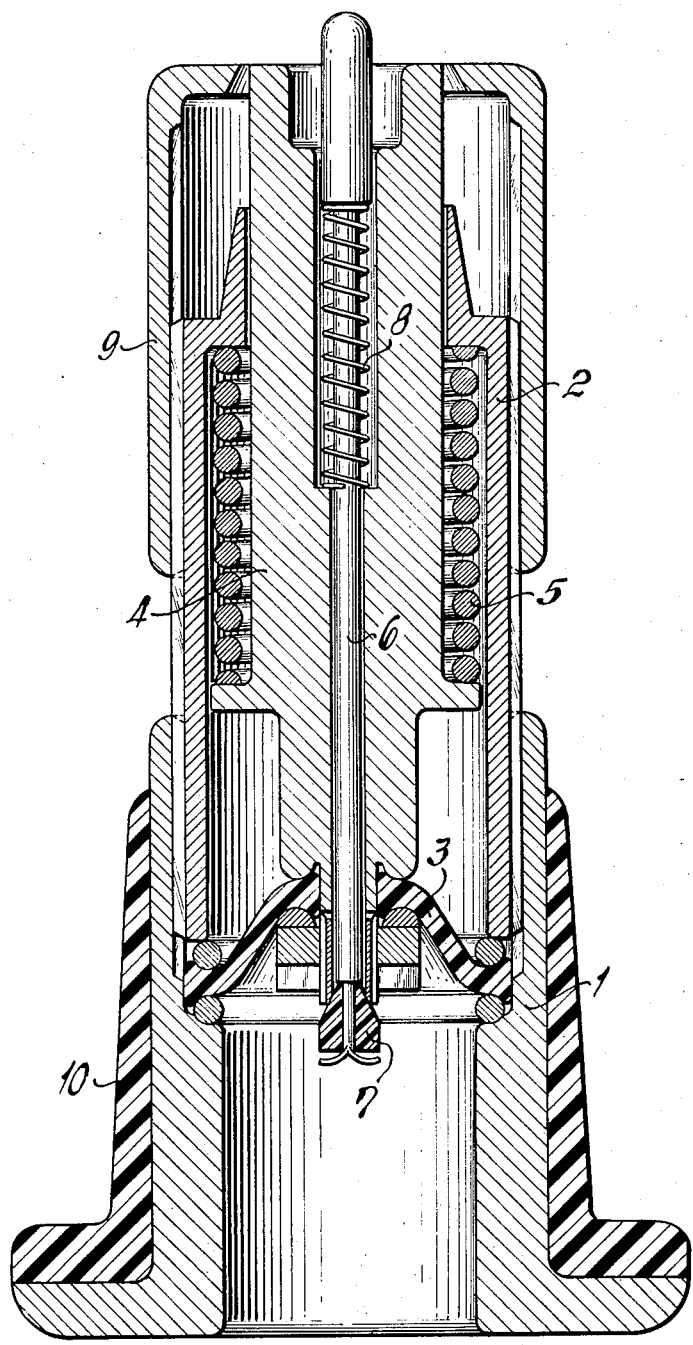

United States Patent
Schmidt

[11] 3,811,459
[45] May 21, 1974

[54] PRESSURE INDICATING VALVE

[75] Inventor: Helmut Schmidt, Pforzheim, Germany

[73] Assignees: Helmut Schmidt, Pforzheim; Erwin Fietz, Bassum, both of, Germany

[22] Filed: July 13, 1972

[21] Appl. No.: 271,521

[30] Foreign Application Priority Data
Mar. 13, 1972 Germany............................ 2212002
June 19, 1972 Germany............................ 2229822

[52] U.S. Cl. .............................. 137/227, 73/146.8
[51] Int. Cl. ............................................ F16k 37/00
[58] Field of Search............ 73/146.8, 146.3, 146.2; 137/227

[56] References Cited
UNITED STATES PATENTS
1,761,454  6/1930  Rockwell .......................... 73/146.3
1,582,523  4/1926  Larson et al........................ 137/227
3,230,968  1/1966  Struby................................. 137/227

*Primary Examiner*—Donald O. Woodiel

[57] ABSTRACT

A composite tubular structure defines an internal cavity and consists of a tubular valve holder and a cylinder, which is fixed in said valve holder and formed with external screw threads disposed axially outwardly of said valve holder. A diaphragm is air-tightly fixed in said composite tubular structure and axially divides said cavity into an outer compartment and an inner compartment. A plunger is connected to said diaphragm and axially slidably mounted in said cylinder and formed with a central axial bore, which comprises an axially inwardly facing shoulder and which communicates through said diaphragm with said inner compartment. Said plunger has an outer portion protruding axially outwardly from said cylinder. An axially outwardly facing, tubular spring abutment is connected to said diaphragm and disposed in said bore and axially inwardly spaced from said shoulder. A valve member extends in said bore and comprises a sealing cone disposed between said shoulder and said abutment and tapering toward and adapted to sealingly engage said bore at said shoulder. A helical compression spring is held between said valve member and said abutment and urges said sealing cone toward said shoulder. An indicating cap has internal screw threads in threaded engagement with said external screw threads of said cylinder. Said cap is disposed axially outwardly of said valve holder and has an axial through bore which is larger in diameter than said outer portion of said plunger.

8 Claims, 2 Drawing Figures

PRESSURE INDICATING VALVE

This invention provides a novel valve for pneumatic tires. The valve gives at any time an indication whether the tire is inflated to the prescribed pressure.

The present invention differs from the previously known inventions of this kind in that in the embodiment which will be described hereinafter the tire can be re-inflated without need to remove the testing mechanism. The pressure-indicating means can indicate pressures within a substantial range without need for a change of the mechanism.

To accomplish that object, the valve according to the invention comprises a valve body which is carried by a diaphragm, which is subjected to the tire pressure on one side, and the valve member is axially movable in a sleeve which is fitted in the tubular valve holder and provided with a screw cap. The valve body extends through the screw cap, which is screwed to be on such a level that it is flush with the end wall of the valve body when the tire is inflated to the desired pressure. A decrease of the tire pressure will then be indicated in that the valve body drops below the preset height. The valve member is depressed against spring action by the nozzle of the inflating hose when the tire is re-inflated and normally protrudes above the valve body.

The valve body and the valve member which is mounted in a recess in the forward face of the valve body are suitably covered by a dust cap. This cap carries preferably an extension at its top and together with the valve body moves axially in the sleeve. This extension enables a checking of the preset tire pressure by touching with the fingers in the dark or at an invisible location, e.g., with twin tires.

The valve member is suitably supported by means of a compression spring on a tubular extension on the top of the diaphragm, which extension is connected to the valve body.

Figure 2:
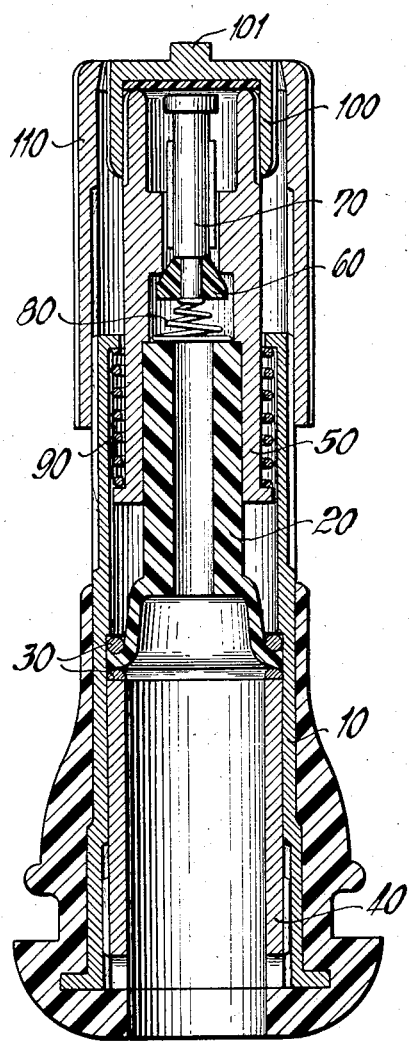

The drawing shows two embodiments of the valve in diagrammatic longitudinal sectional views. Specifically, FIG. 1 shows a valve having no dust cap and
FIG. 2 shows a valve provided with a dust cap.

Both valves are shown in the condition assumed when the tire is inflated to the prescribed pressure.

A cylinder 2 is threaded into the tubular valve holder 1, preferably into recessed screw threads thereof, and forces a diaphragm 3 into tightly sealing engagement with a shoulder which is formed in the valve holder 1. The diaphragm 3 is formed at its top with an opening, through which a plunger 4 extends into the lower compartment of the valve holder 1, which lower compartment is defined by the diaphragm 3. A compression spring 5 is inserted between a diametrically protruding rim of the pluger 4 and a shoulder formed in the cylinder wall, which in its upper portion is reduced in diameter. The compression spring 5 is shown in a stressed condition in the drawing.

A vertical central bore in the piston 4 contains a valve member 6, which is partly similar in design to the valve members which are known in conventional tire valves. This valve member is provided at its lower end with a sealing cone 7, which consists preferably of rubber. A coil spring 8 is provided between a shoulder in the bore of the plunger 4 and a step of the valve member 6 and forces the sealing cone 7 of the valve member 6 against the rim of the bore in the plunger 4 so that said bore is air-tightly sealed.

An indicating cap 9 is screwed onto the upper portion of the cylinder 2. That upper portion protrudes from the valve holder 1 and is provided with external screw threads. The bore of the cap 9 enables a limited free axial movement of the piston 4.

The function is as follows: When the tire has been inflated to the prescribed pressure, that pressure acts on the diaphragm and moves the plunger 4 connected to the diaphragm to a position which depends on the value of the tire pressure and the opposing force exerted by the compression spring 5. As a result, the top end of the piston is pushed more or less above the top rim of the cylinder 2. The indicating cap 9 is then screwed inwardly to such an extent that its rounded top rim is exactly flush with the end face of the piston 4. When the tire pressure decreases, the pressure acting on the diaphragm 3 and the compression spring 5 decreases too and the plunger is pushed back in dependence on the decrease in pressure so that a recess is formed in the plane defined by the rounded top end of the indicating cap 9 and the end face 4; this recess indicates that the pressure has decreased.

When the tire must be re-inflated, the indicating cap 9 is unscrewed. The nozzle of the inflating hose is applied to the plunger 4, which protrudes from the cylinder 2. When the plunger 4 has been pushed into the cylinder 2, the nozzle fits over the top portion of the cylinder. That top portion has preferably a conical taper on its outside. The valve member 6 is depressed by the pin provided in the nozzle of the hose and now opens the passage through the bore of the plunger 4 so that the air can flow into the air chamber of the tire to reinflate the same. When the inflating operation has been terminated and the nozzle of the inflating hose has been removed, the valve member 6 is returned to its initial position partly by the coil spring 8 and partly by the higher pressure which is now present. The sealing cone 7 is forced against the bore of the plunger 4 so as to seal said bore.

In the embodiment shown by way of example, the valve holder 1 is provided at its lower end with a rubber sleeve 10 for use with tubeless tire, or with a boltable flange as is known for use with air tubes.

In the embodiment shown in FIG. 2, a sleeve 10 is fitted in the valve holder. A diaphragm 20 is inserted in said sleeve and formed with a tubular extension at its top. The rim of the diaphragm is gripped between two clamping rings 30, which are forced by a screw-threaded cylindrical insert 40 or by a pressed-in insert against a shoulder formed in the wall of the sleeve. In this way, the cavity in the sleeve 10 is divided into two compartments, which are hermetically sealed from each other when the opening at the tubular top portion of the diaphragm 20 has been sealed by the mechanism which will be explained hereinafter and is disposed in the valve body 50.

A conical spring 80 is provided between the end face of the tubular top portion of the diaphragm 20 and a valve member 70, which is provided with a sealing cone 60. The conical spring forces the sealing cone 60 against the inner edge of a tapered bore of the valve body 50 to seal the bore. The valve member 70 is axially movable in the offset bore of the valve body 70 to an extent which is limited by the engagement of the sealing cone 60 on the end face of the tubular upper portion of the diaphragm 20 when the conical spring 80 has been stressed in compression. In the embodiment shown by way of example, the valve member 70 is provided with longitudinal grooves, which ensure that the valve member is slidably guided in the offset bore of the valve body 50 and define flow passages between the tapered bore of the valve body 50 and the wall of the valve member.

A helical spring 90 is inserted between the inwardly protruding top rim of the sleeve 10 and the outwardly protruding lower rim of the valve body 50.

The valve body 50 is provided at its top portion with external screw threads, into which a sealing dust cap 100 is threaded, which is provided at its top with an extension 101. The top portion of the sleeve 10 is provided with external screw threads, onto which a screw cap 110 is threaded.

The function is as follows:

To inflate a tire, the screw cap 110 and the dust cap 100 are unscrewed. When the nozzle of the inflating hose is then fitted over the valve body 50, which protrudes from the sleeve 10, and compressed air is introduced, the valve member 70 is displaced and the sealing cone 70 opens a flow passage through the diaphragm 20 into the interior of the tire. When the prescribed pressure has been reached, the nozzle of the inflating hose is removed and the diaphragm which was previously curved inwardly of the valve under no pressure is now curved outwardly of the valve in response to the tire pressure acting on the diaphragm and the opposing action of the coil spring 90 so that the valve body firmly connected to the diaphragm is displaced until the equilibrium between the actual tire pressure and the opposing action of the spring has been established. Then the dust cap 100 is tightened and the screw cap 110 is screwed inwardly until its top rim and the surface of the dust cap 100 define a plane from which only the pin 101 of the dust cap 100 protrudes. When the pressure in the tire decreases, the coil spring 90 forces the valve body 50 inwardly so that a recess becomes visible in the plane previously defined by the rim of the screw cap and the surface of the dust cap. This recess indicates the decrease in pressure. The pin 101 provided on the surface of the dust cap 100 enables a detection of a pressure drop by touching with the fingers in the dark or when the vision is otherwise obstructed, e.g., at the inner tire of twin tires. For this purpose, that pin is dimensioned so that its movement to a position below the rim of the screw cap means a pressure loss of about 10 percent.

What is claimed is:

1. A pressure-indicating valve, which comprises
a tubular sleeve,
a cylinder insert fixed in said sleeve, said sleeve and said cylinder insert forming a composite tubular structure defining an internal cavity, said tubular structure having external screw threads disposed axially outwardly thereon,
a diaphragm air-tightly fixed in said composite tubular structure and axially dividing said cavity into an outer compartment and an inner compartment,
a valve body connected to said diaphragm and axially slidably mounted in said cylinder and formed with a central axial bore, said valve body having an axially inwardly facing shoulder, said valve body having an outer portion protruding axially outwardly from said tubular structure,
a dust cap removably mounted on said outer portion of the valve body to seal said bore,
an axially outwardly facing, tubular spring abutment, which is connected to said diaphragm and disposed in said bore and axially inwardly spaced from said shoulder,
a valve member extending in said bore and including a sealing cone disposed between said shoulder and said abutment and tapering toward and adapted to sealingly engage said bore toward said shoulder, whereby air under pressure can be added to said inner compartment through said bore,
an indicating screw cap having internal screw threads in treaded engagement with said external screw threads of said tubular structure, said cap being disposed axially outwardly of said tubular structure and having an axial through bore which is larger in diameter than said outer portion of said dust cap, said diaphragm being responsive to changes in air pressure differentials between said inner compartment and said outer compartment, said indicating screw cap being adjustable to permit the top outside surface of the indicating screw cap to be flush with the top outside surface of the dust cap, said dust cap defining a recess with respect to said indicating screw cap as the diaphragm responds to a change in said air pressure differential on reduction of air pressure within said inner compartment.

2. A pressure-indicating valve as set forth in claim 1, in which said cylinder insert is screw-threaded into said sleeve.

3. A pressure-indicating valve as set forth in claim 1, in which said sleeve is provided at its axially inner end with a rubber sleeve for connecting said valve holder to a tubeless tire.

4. A pressure-indicating valve as set forth in claim 1, in which said sleeve is provided at its axially inner end with a flange for connecting said valve holder to an air tube.

5. A pressure-indicating valve as set forth in claim 1, in which said diaphragm is tightly connected to said valve body.

6. A pressure-indicating valve as set forth in claim 1, in which said diaphragm is provided with an axially outwardly extending, central tubular extension forming said spring abutment.

7. A pressure-indicating valve as set forth in claim 1, which comprises springs means urging said valve body axially inwardly relative to said cylinder.

8. A pressure indicating valve as set forth in claim 1, wherein said recess is defined in response to a pressure reduction of about 10 per cent within said inner compartment.

* * * * *